Jan. 4, 1949. S. W. GORDON 2,458,259
TRACTOR COUPLER
Filed Feb. 27, 1947

Inventor
Samuel W. Gordon
By Fraser and Bishop
Attorneys

Patented Jan. 4, 1949

2,458,259

UNITED STATES PATENT OFFICE 2,458,259

TRACTOR COUPLER

Samuel W. Gordon, Canal Fulton, Ohio, assignor of one-half to Marvin J. Gordon, Sr., Canal Fulton, Ohio Application February 27, 1947, Serial No. 731,180

7 Claims. (Cl. 280—33.15)

1

The invention relates generally to devices for detachably connecting two vehicles, and particularly to a coupler or hitch for quickly connecting a tractor to any one of a number of farm implements to be towed by the tractor.

It is an object of the present invention to provide a novel coupler which automatically locks in coupling position, and which is quickly movable to uncoupling position.

Another object is to provide a novel coupler which is adapted to be coupled and locked, and unlocked and uncoupled without the use of tools.

Another object is to provide an improved coupler which is adapted equally well for transmitting pushing and pulling forces between a tractor and vehicle, so as to function in pulling forwardly or pushing backwardly.

Another object is to provide a novel and improved coupler construction which is simple and economical to make and easy to operate.

A further object is to provide an improved coupler which is adapted for making a quick detachable connection between a standard tractor and anyone of a number of standard towed implements.

These and other objects are accomplished by the parts, improvements, constructions and combinations comprising the present invention, a preferred embodiment of which is shown by way of example in the accompanying drawing and described in detail in the specification and defined in the appended claims.

In general terms, the novel coupler comprising the present invention may be stated as including an outer sleeve having a yoke projecting from one side for pivotal connection with a tractor tongue or towing bar and an inner sleeve axially rotatable in the outer sleeve, there being a T slot in the outer sleeve and a longitudinal slot in the inner sleeve for registering with the top longitudinal portion of the T slot to allow insertion or removal of a coupling member pivotally connected with a towed vehicle, whereby when the inner sleeve is rotated out of register the coupling member is held therein.

Referring to the drawing in which a preferred embodiment of the invention is shown by way of example;

Similar numerals refer to similar parts throughout the several views of the drawing.

Figure 1:
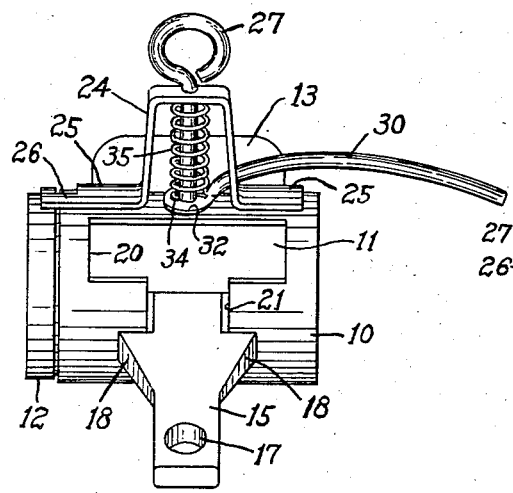
Figure 1 is a perspective view of the improved coupler, viewed partly from the top and partly from the side.
Figure 2:
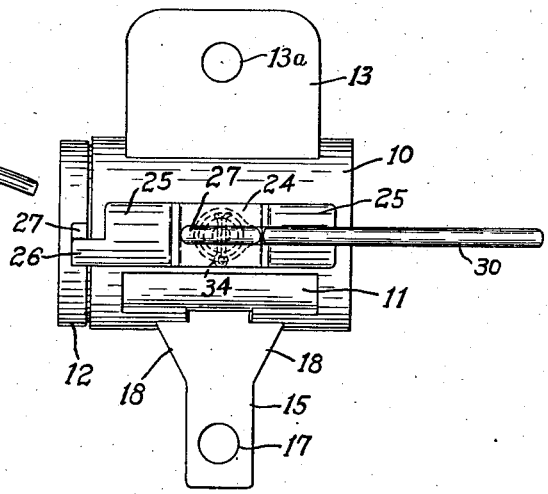
Fig. 2 is a top plan view thereof.
Figure 4:
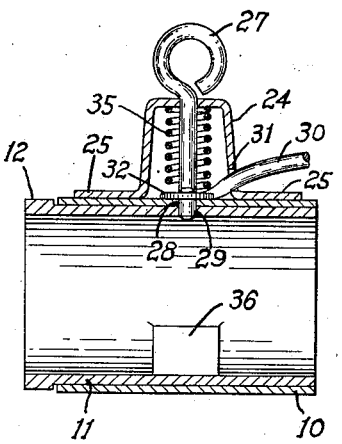
Fig. 4 is a longitudinal sectional view as on line 4—4, Fig. 3.

The novel coupler preferably includes an outer sleeve 10 and an inner sleeve 11 which is axially rotatable in the outer sleeve 10. As shown in Figs. 1, 2 and 4, the inner sleeve may have an enlarged annular portion or collar 12 at one end which projects beyond the outer sleeve 10 and which provides a shoulder adjacent thereto.

Figure 3:
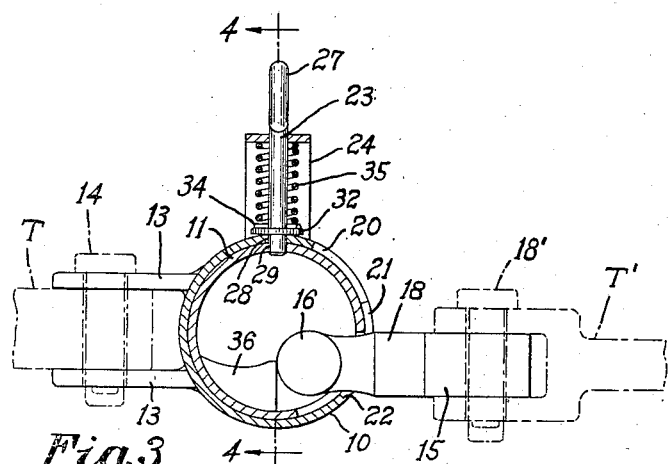
Fig. 3 is a transverse sectional view thereof, showing the coupler in locked position.

As best shown in Fig. 3, vertically spaced arms 13 project laterally from one side of the outer sleeve to form a yoke or clevis for pivotal connection with the tongue or tow bar T of a standard tractor. As indicated in dot-dash lines, the connection with the tow bar may be made by means of a pin 14 which fits loosely in registering holes 13a in the arms 13 of the clevis. As shown in Fig. 3, the arms 13 may be secured by welding to the side of the outer sleeve 10.

Figure 6:
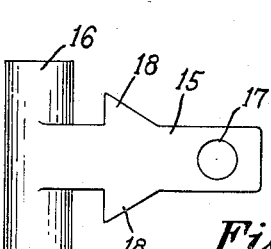
Fig. 6 is a detached plan view of the T-shaped coupler member which is adapted for insertion into the coupler for making connection with a towed vehicle.

The coupler member for making a pivotal connection with a tongue or the like on the towed vehicle is best shown in Fig. 6, and consists of a T-shaped member having the stem 15 and the cross head 16 which is preferably cylindrical in cross section. The end portion of the stem 15 preferably has a hole 17 therein for loosely receiving a pivot pin 18 for making pivotal connection with the tongue T', as indicated in dot-dash lines in Fig. 3. The stem 15 of the T-shaped coupling member is provided with wings 19 for a purpose to be described.

Figure 5:
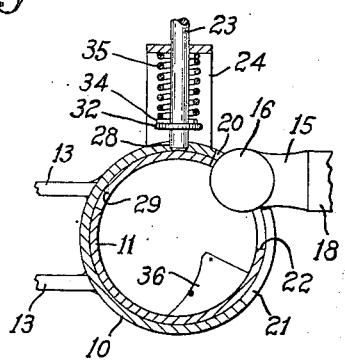
Fig. 5 is a fragmentary section similar to Fig. 3, showing the coupler in unlocked position.

For making quick detachable connection between the tractor and towed vehicle, the cross head 16 of the T-shaped coupling element is inserted through the outer and inner sleeves 10 and 11, and for this purpose the outer sleeve has a T-shaped slot consisting of a top longitudinal portion 20 and a vertical lower portion 21, and the inner sleeve 11 has a longitudinal slot 22 which is adapted to register with the portion 20 of the T slot when the coupler is in unlocked position as shown in Fig. 5. Obviously, the longitudinal portion 20 of the T slot and the longitudinal slot 22 are of such dimensions that when registered they will permit the cross head 16 of the T bar to be easily inserted therethrough without materially tilting the T bar.

The means for locking the sleeves 10 and 11 in the unregistering position of Fig. 3, to prevent withdrawal of the cross head 16, preferably includes a spring-pressed latch bar 23 which is slidably mounted in a U-shaped bracket 24 secured on top of the outer sleeve preferably by welding the arms 25 of the bracket to the exterior of the sleeve. As shown, one of the arms 25 may project longitudinally over the collar 12 of the inner sleeve so that the outer end portion 26 of the arm will abut a lug 27 on the collar 12 to provide a stop for limiting the rotary movement of the inner sleeve to its locked position.

The outer end of the latch bar 23 is preferably in the form of an eye 27, and the inner end is adapted to pass through registering holes 28 and 29 in the outer and inner sleeves respectively, for holding the sleeves in the locked or non-registering position of Fig. 3. Preferably, a release lever 30 extends through a hole 31 in the bracket 24, and has a spring abutment portion 32 at its inner end engirdling the latch bar 23 and held in position thereon by a cotter pin 34. A helical spring 35 is interposed between the abutment portion 34 and the top of the bracket 24 for yieldingly urging the latch bar 23 inwardly of the sleeves 10 and 11.

In the operation of the improved coupler, assuming that the arms 13 of the clevis are connected to the tow bar T of a tractor and the T bar of the coupler is connected to the tongue T' of the vehicle to be towed, the cross head 16 of the T bar is inserted through the sleeves 10 and 11 in the manner shown in Fig. 5. In the unlocked or registering position of the sleeves, as shown in Fig. 5, the longitudinal slot 22 of the inner sleeve is in register with the top longitudinal portion 20 of the outer sleeve 10 so that the cross head 16 can be inserted easily through the registering slots. Once the cross head is within the inner sleeve 11, the T bar is pushed downwardly and the stem 15 of the T bar enters the vertical portion 21 of the T slot and engages the bottom of inner sleeve slot 22 to rotate the inner sleeve in a clock-wise direction. When the hole 29 in the inner sleeve registers with the hole 28 of the outer sleeve, the spring 35 will snap the latch pin 23 into the hole 29 and lock the sleeves 10 and 11 in the position of Fig. 3. The coupler is now in position to provide a towing connection between the tractor and the towed vehicle because the cross head 16 overlaps the vertical slot 21 on both sides and provides a connection which allows a certain amount of vertical swinging motion of the T bar about the cross head as a pivot but which prevents raising and removal of the cross head, and at the same time the T bar can pivot in a horizontal plane about the pin 18 while the tow bar T of the tractor can pivot about the pin 14.

The wings 18 of the T bar overlap the vertical slot 21 on the exterior of the sleeve 10 to provide thrust abutments against said sleeve, and the inner sleeve 11 is provided with a shoulder 36 also for taking the thrust of the cross head 16 when the tractor is backed to push against the tongue of the towed vehicle.

When it is desired to disconnect the coupler, it is only necessary to push downwardly on the outer end of release lever 30 to hold the latch bar 23 free of the inner sleeve 11, and the T bar 15 can then be raised to rotate the inner sleeve counterclockwise until its longitudinal slot 22 registers with the top portion 20 of the T slot, whereupon the T bar is quickly withdrawn through the registering slots.

Thus, the novel coupler is automatically locked in operating position and manually unlocked without the aid of tools, and is economical to make and easy to operate. The improved coupler is adapted equally well for transmitting pushing and pulling forces, and for use with any standard tractor and implement constructions.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. A coupler for detachably connecting a towing vehicle to a towed vehicle, including an outer sleeve having a horizontally extending yoke on one side adapted for pivotal connection with one of said vehicles, said outer sleeve having a T slot in its opposite side, an inner sleeve axially rotatable in said outer sleeve, said inner sleeve having a longitudinal slot for registering with the top longitudinal portion of said T slot, a coupler bar insertable in substantially horizontal position through said registering slots and pivotally connected on a vertical pivot with the other vehicle, and latch means for locking said sleeves in non-registering position with said coupler bar projecting through the lower portion of said T slot.

2. A coupler for detachably connecting a towing vehicle to a towed vehicle, including an outer sleeve having a yoke on one side adapted for pivotal connection with one of said vehicles, said outer sleeve having a T slot in its opposite side, an inner sleeve axially rotatable in said outer sleeve, said inner sleeve having a longitudinal slot for registering with the top longitudinal portion of said T slot, a T-shaped coupler bar adapted for pivotal connection with said other vehicle, the cross head of said bar being insertable in substantially horizontal position through said registering longitudinal slots and the stem being adapted to extend horizontally through the lower portion of said T slot when said slots are not in register, and latch means for locking said sleeves with said slots out of register.

3. In a coupler for detachably connecting two vehicles, an outer sleeve having a T slot in one side, an inner sleeve having a longitudinal slot for registering with the top portion of said T slot, a T-shaped coupler bar having a cross head insertable in substantially horizontal position through said slots when in register and having a stem for extending through said inner longitudinal slot when not in register and horizontally through the lower portion of said T slot with the cross head overlapping said T slot lower portion, and latch means for locking said sleeves in said non-registering position.

4. A coupler for detachably connecting a towing vehicle to a towed vehicle, including an outer sleeve having a horizontally extending yoke on one side adapted for pivotal connection with one of said vehicles, said outer sleeve having a T slot in its opposite side, an inner sleeve axially rotatable in said outer sleeve, said inner sleeve having a longitudinal slot for registering with the top longitudinal portion of said T slot, a coupler bar insertable in substantially horizontal position through said registering slots when pivotally connected with the other vehicle, and a spring-pressed latch bar mounted on said outer sleeve for engaging and locking said sleeves in non-registering position with said coupler bar projecting through the lower portion of said T slot.

5. A coupler for detachably connecting a towing vehicle to a towed vehicle, including an outer sleeve having a yoke on one side adapted for pivotal connection with one of said vehicles, said outer sleeve having a T slot in its opposite side, an inner sleeve axially rotatable in said outer sleeve, said inner sleeve having a longitudinal slot for registering with the top longitudinal portion of said T slot, a T-shaped coupler bar adapted for pivotal connection with said other vehicle, the cross head of said bar being insertable in substantially horizontal position through said registering longitudinal slots and the stem being adapted to extend horizontally through the lower portion of said T slot when said slots are not in register, and a spring-pressed latch bar mounted on said outer sleeve for engaging and locking said sleeves together with said slots out of register.

6. In a coupler for detachably connecting two vehicles, an outer sleeve having a T slot in one side, an inner sleeve having a longitudinal slot for registering with the top portion of said T slot, a T-shaped coupler bar having a cross head insertable in substantially horizontal position through said slots when in register and a stem for extending in substantially horizontal position through said inner longitudinal slot when not in register and through the lower portion of said T slot with the cross head overlapping said T slot lower portion, and a spring pressed latch bar mounted on said outer sleeve for engaging and locking said sleeves in non-registering position.

7. In a coupler for detachably connecting two vehicles, an outer sleeve having a T slot in one side, an inner sleeve having a longitudinal slot for registering with the top longitudinal portion of said T slot, a T-shaped connector bar having a cross head insertable in substantially horizontal position through said longitudinal slots when in register and a stem for extending in substantially horizontal position through said inner longitudinal slot when not in register and through the lower portion of said T slot, an abutment shoulder in the inner sleeve for taking the thrust of said cross head in the non-registering position, and a spring-pressed latch for locking the sleeves in the non-registering position.

SAMUEL W. GORDON.

REFERENCES CITED

The following references are of record in the file of this patent:

UNITED STATES PATENTS

| Number | Name | Date |
|---|---|---|
| 299,556 | Lecompte | June 3, 1884 |
| 447,439 | Strother | Mar. 3, 1891 |
| 449,235 | Rose et al. | Mar. 31, 1891 |
| 695,030 | Cain | Mar. 11, 1902 |
| 869,758 | Warele | Oct. 29, 1907 |
| 1,858,785 | Miller | May 17, 1919 |